J. M. MAYER.
Brick Truck.
No. 91,358.
Patented June 15, 1869.
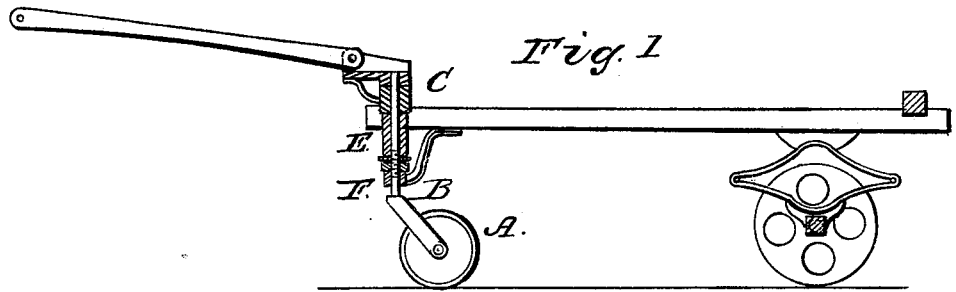
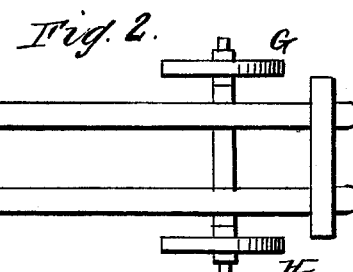
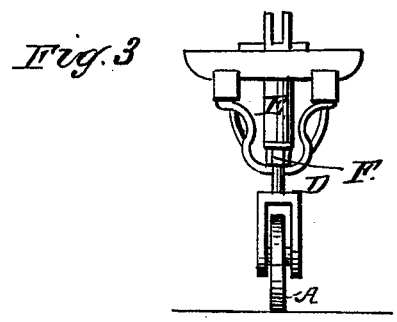

United States Patent Office.

JOHN M. MAYER, OF RONDOUT, NEW YORK.

Letters Patent No. 91,358, dated June 15, 1869.

IMPROVEMENT IN BRICK-TRUCKS.

The Schedule referred to in these Letters Patent and making part of the same.

*To all whom it may concern:*

Be it known that I, JOHN M. MAYER, of Rondout, in the county of Ulster, and State of New York, have invented a new and improved Brick-Truck; and I do hereby declare that the following is a full, clear, and exact description thereof, which will enable others skilled in the art to make and use the same, reference being had to the accompanying drawings, forming part of this specification.

The object of this invention is to provide a three-wheeled truck for moving the moulded brick while in a soft state, capable at all times of maintaining the load in a level condition, to prevent the substance of the bricks from flowing, and becoming thicker on the lower sides, as they will do when not kept in a level position.

Figure 1 represents a longitudinal section of my improved brick-truck;

Figure 2 represents a plan view of the same; and

Figure 3 represents a front elevation.

Similar letters of reference indicate corresponding parts.

For various reasons, it is more convenient to employ trucks having but three wheels for moving the brick in the soft condition. These trucks, as commonly constructed, are not provided with springs or other means, under the front end of the platform, to allow that end to yield evenly with the hind end, which must necessarily be supported on springs, to avoid jarring the soft brick as much as possible. The consequence of this arrangement is, that when loaded, the rear ends of the platforms are lowest, and the substance of the bricks will flow, to some extent, in that direction, causing the bricks to be thicker at one side than the other. This tendency is greatly enhanced by the jarring and shaking of the truck.

To avoid this difficulty, I propose to provide an adjustable and springing support for the front end of the platform, whereby it may be kept level under the load.

To this end, I support the front wheel A in a caster, B, having a long stem, C, rising up through a guard, D, projecting downward from the platform, and supported by braces.

The stem rises also through the platform, which is supported, at its rear end, upon springs affixed to the axle of the wheels G H.

Between the guard D and the lower side of the platform, which I prefer to recess around the hole for the stem C, I interpose, around the stem, a rubber spring, E, and, below the spring, a nut, F, screwing up and down on the rod C. The weight of the load is, therefore, suspended on the said stem C, through the nut, and the spring and the latter may be so adjusted, relatively to the stem C of the bracket, that when loaded the platform may be kept level, as will be clearly understood.

Having thus described my invention,

I claim as new, and desire to secure by Letters Patent—

The combination of the spring E and its adjusting nut F with the caster A B, screw-threaded stem C, frame D, and the front end of the platform of a brick-truck, whose rear end is supported upon the wheels G H, arranged as herein shown and described.

The above specification of my invention, signed by me, this 4th day of February, 1869.

JOHN M. MAYER.

Witnesses:
FRANK BLOCKLEY,
ALEX. F. ROBERTS.